E. F. DILLMANN.
HEADLIGHT FOR AUTOMOBILES.
APPLICATION FILED AUG. 9, 1917.

1,302,017.

Patented Apr. 29, 1919.

WITNESS:
Howard P. King

INVENTOR:
Ernest F. Dillmann,
BY
Marble & Everett,
ATTORNEY.

UNITED STATES PATENT OFFICE.

ERNEST F. DILLMANN, OF NEWARK, NEW JERSEY.

HEADLIGHT FOR AUTOMOBILES.

1,302,017.  Specification of Letters Patent.  Patented Apr. 29, 1919.

Application filed August 9, 1917. Serial No. 185,285.

*To all whom it may concern:*

Be it known that I, ERNEST F. DILLMANN, a citizen of the United States of America, and a resident of Newark, in the county of Essex and State of New Jersey, have invented new and useful Improvements in Headlights for Automobiles, of which the following is a specification.

This invention relates to lamps, and more particularly headlights for automobiles, which can be used as searchlights, by elevating them above their normal positions and directing their light rays over the hood and fenders of the automobile, and the objects of the invention are to enable a headlight when elevated to be turned or rotated without elevation, so that its rays of light will retain the same level; to enable the headlight to be elevated without rotation and afterward turned in any direction without further elevation; to provide effective means for accomplishing these results; to secure means for both elevating the headlight and directing its light rays in the desired direction by manipulation of a single control; to first raise the headlight and then rotate it the desired amount; to secure simplicity of construction and operation, and to obtain other advantages and results as may be brought out in the following description.

Referring to the accompanying drawings, in which like numerals of reference indicate the same parts throughout the several views, Figure 1 is a side elevation of an automobile with parts broken away to show my invention applied thereto;

Figure 1:
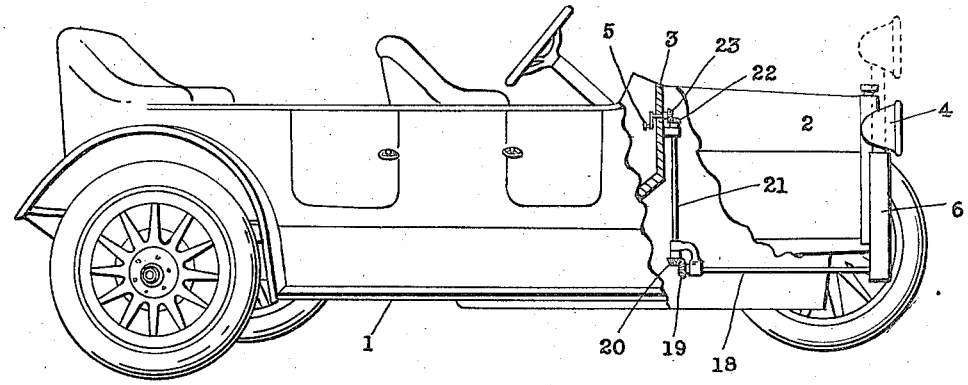
Figure 2:
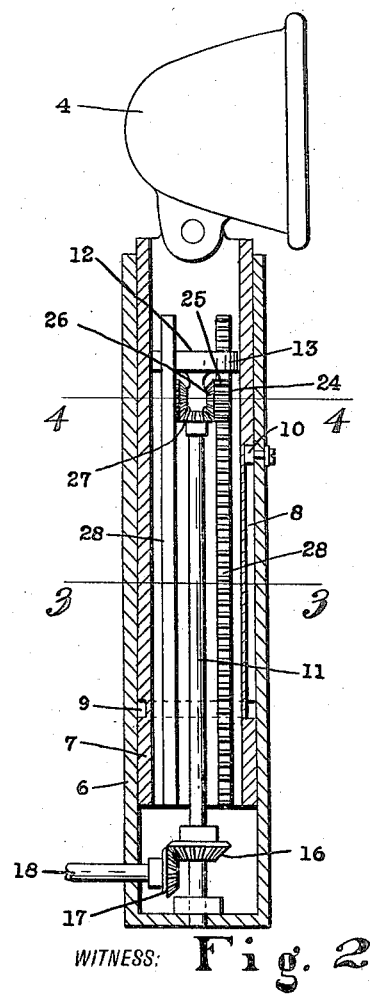
Fig. 2 is a central vertical section of the telescopic supporting and guiding means for the headlight as upon line 2—2 of Fig. 3.
Figure 3:
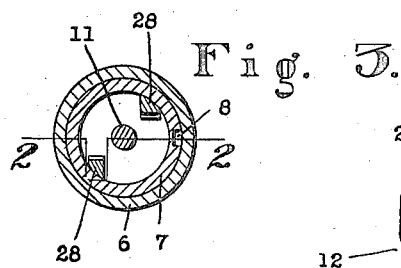
Fig. 3 is a transverse section line 3—3 of Fig. 2.
Figure 6:
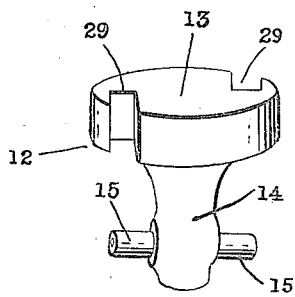
Fig. 6 is a perspective view of a certain bearing for the lifting gears within said telescopic member.
Figure 5:
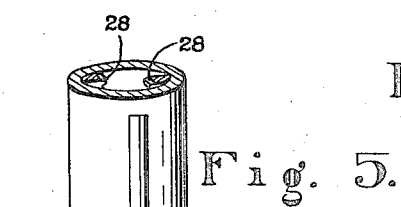
Fig. 5 is a perspective view of a portion of the inner telescopic member.
Figure 4:
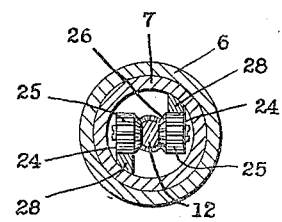
Fig. 4 is a cross-section on line 4—4 of Fig. 2.

In the specific embodiment of the invention illustrated in said drawings, the reference numeral 1 indicates an automobile or other vehicle to which my invention is applied, said automobile of the present disclosure having the usual hood 2 and dashboard 3. Preferably the front of the automobile and at the side of the hood, I provide a headlight having a casing or reflector 4 normally at an elevation below the top of the hood for use as a headlight for the vehicle, but adapted to be elevated by a crank 5 or other suitable means, preferably on the dashboard of the automobile, for use as a searchlight, said reflector being in its raised position adapted to turn around or rotate and shine the light in any desired direction.

The structure employed for carrying out my invention provides a pair of telescopic cylindrical members 6, 7 the outer one, 6, preferably being secured in a vertical position to the automobile or other vehicle and the inner one 7 carrying at its upper end the lamp or headlight proper 4. One of said members, and as shown the inner one 6, is provided with a longitudinal slot 8 in its outer wall of a length corresponding to the height which it is desired to elevate said member. At the bottom of said slot 8 is a peripheral groove 9 also cut in the outer wall of said inner member, and in communication with the slot. Suitable means, such as the roller 10, projects into said slot 8 from the outer member, preventing relative rotation between said members while in the slot but permitting longitudinal movement of the the inner member, thus permitting the inner member to be extended without rotating until the roller 10 enters the groove 9. When thus extended, the inner member may be rotated, by virtue of the roller 10 being in the groove 9, and while being so turned is prevented from longitudinal movement, or retraction until turned back to its initial position.

In order to so elevate and rotate the lamp-carrying member, I provide axially within it a shaft 11 having a bearing at its bottom end in the outer member and rotatably inserted at its upper end in a floating bearing or head 12. This head provides a disk-like top plate 13 of substantially the diameter of the inside of the inner member so as to be held by engagement therewith from lateral movement, but at the same time permitting the member to slide outwardly, without going with it. From the middle of said plate 13 depends a stem 14 having laterally projecting studs 15, 15 for gears 24 subsequently described, and having a recess or bearing in its bottom for the upper end of the shaft 11.

The shaft 11 is adapted to be rotated from the crank 5 on the dashboard 3. To this end I have shown a beveled gear 16 adjacent the lower end of said shaft 11 in mesh with another bevel gear 17 on a transverse shaft 18 extending from the said telescopic member rearwardly of the automobile and driven through the agency of other bevel gears 19, 20 from a shaft 21 which extends upwardly adjacent the dashboard. A bevel gear 22 at the upper end of this last-mentioned shaft is in mesh with a bevel gear 23 fast with respect to the crank 5. However, it is to be understood that other means may be employed for driving the shaft 11 within the telescopic members, this particular drive being shown for illustrative purposes.

Within the telescopic members, and rotatably mounted upon the studs 15, 15 of the floating bearing or head 12 are gears 24 having peripheral teeth 25 and at their inner sides bevel gear teeth 26, the latter being in mesh with a bevel gear 27 at the upper end of the shaft 11. The peripheral or pinion teeth 25 mesh in vertically disposed racks 28 which are fast within the inner telescopic member and at relatively diametric opposite sides of their respective gears, that is, one rack is upon one side of its gear and the other rack is upon the opposite side of its gear. Thus, rotation of said gears in opposite directions, which occurs when driving them from the single bevel gear, will cause both of the racks to be elevated simultaneously or lowered simultaneously. In this way the extensible or inner telescopic member is raised without any tendency to tilt it, which would cause it to bind, and is therefore subject to minimum wear as well as being very readily operated. Recesses or notches 29, 29 are made in the top plate 13 of the head 12 for the passage of the racks acting as keys for preventing relative rotation between the said member and head 12.

In operation, by turning the crank 5, the shaft 11 within the telescopic members is rotated, and since the roller 10 riding in the longitudinal slot 8 prevents relative rotation between said members, the gears 24, 24 upon the head 12 operate upon the racks 28, 28 to raise or extend the inner telescopic member 7. When the said member is entirely raised, the roller is at the bottom of the slot preventing further longitudinal movement of the member, but is then in the peripheral groove 9. Continued rotation of the shaft 11, tending to revolve the gears 24, since they are prevented from rotating, turns the inner member upon its axis and throws the light rays from the lamp 4 in a direction other than straight ahead of the automobile. In this way the headlight may be utilized as a searchlight, it being noted that by elevating the headlight it can be directed upon objects at either side of the vehicle. The lamp may be turned through a range of 360°, and may be used to illuminate the road toward the back of the car, when desired, as when it becomes necessary to replace a tire.

Obviously detail modifications and changes may be made in manufacturing my improved headlight without departing from the spirit and scope of the invention, and I do not wish to be understood as limiting myself except as required by the following claims when construed in the light of the prior art.

Having thus described the invention, what I claim is—

1. In a headlight, the combination with a lamp adapted to be arranged at the front of an automobile, of a mounting for said lamp having telescopic members, and means for extending said members and rotating the lamp-carrying member without further extension when in extended position.

2. In a headlight, the combination with a lamp adapted to be arranged at the front of an automobile, of a mounting comprising telescopic members, and means for extending said members without rotation and rotating the lamp-carrying member without further extension when in extended position.

3. In a headlight, the combination with a lamp adapted to be arranged at the front of an automobile, telescopic members for supporting said lamp, means coöperating with said members for preventing relative rotation while the extensible member is in other than extended position and permitting rotation without up and down movement while said member is extended, and means for extending said member.

4. In a headlight, the combination with a lamp adapted to be arranged at the front of an automobile, telescopic members one of which is secured to the automobile and the other of which carries the lamp, one of said members having a longitudinal slot and a peripheral groove, and means carried by the other member projecting into said groove and slot permitting the slotted and grooved members to be extended without rotating while said means is in the slot and permitting rotation and preventing longitudinal movement of said member while said means is in the groove.

5. In a headlight, the combination with a lamp adapted to be arranged at the front of an automobile, telescopic members one of which is secured to the automobile and the other of which carries the lamp, one of said members having a longitudinal slot and a peripheral groove, means carried by the other member projecting into said groove and slot permitting the slotted and grooved members to be extended without rotating while said means is in the slot and permitting rotation and preventing longitudinal movement of said member while said means is in the groove, and means for extending and rotating said member.

6. In a headlight, the combination with a lamp adapted to be arranged at the front of an automobile, telescopic members the outer one of which is secured to the automobile and the inner one of which carries the lamp, racks in said inner member, gears for raising said racks and inner member, and means for rotating said inner member when raised.

7. In an automobile or the like, the combination with a lamp arranged at the front thereof, telescopic members one of which is secured to the automobile and the other of which carries the lamp, means for permitting the lamp-carrying member to be extended without rotating and then rotated and prevented from longitudinal movement, and means operated from the dashboard of the automobile for so operating said member.

8. The combination with a lamp, of a mounting comprising telescopic members the inner one of which carries the lamp, racks on said inner member, gears engaging said racks, means for turning said gears and the inner member, and means for guiding the movement of the inner member with respect to the outer one.

9. The combination with a lamp, of a mounting comprising telescopic members the inner one of which carries the lamp, means inside the inner member for moving it with respect to the other member, and means for guiding said movement of the inner member.

10. The combination with inner and outer tubular telescopic members, of racks in the inner member, gears inside said inner member engaging said racks, means for turning said gears from outside the inner member, and means for guiding the movement of the inner member with respect to the outer member.

11. The combination with inner and outer tubular telescopic members, of racks in the inner member, a bearing in said inner member independent of longitudinal movement thereof, gears on said bearing engaging said racks, means for turning said gears from outside the inner member, and means for guiding the movement of the inner member with respect to the outer member.

12. The combination with inner and outer tubular telescopic members, of racks in the inner member, a bearing in said inner member independent of longitudinal movement thereof and adapted to rotate therewith, gears on said bearing engaging said racks, means for turning said gears from outside the inner member, and means for guiding the movement of the inner member with respect to the outer member.

13. The combination with inner and outer tubular telescopic members, of racks in the inner member, a bearing in said inner member recessed to receive said racks and independent of longitudinal movement of the inner member and racks, gears on said bearing engaging said racks, means for turning said gears from outside the inner member, and means for guiding the movement of the inner member with respect to the outer member.

In testimony whereof I have signed this specification in the presence of two subscribing witnesses.

ERNEST F. DILLMANN.

Witnesses:
HOWARD P. KING,
JANET A. AYERS.

Copies of this patent may be obtained for five cents each, by addressing the "Commissioner of Patents, Washington, D. C."